(12) United States Patent
Garner et al.

(10) Patent No.: US 8,895,892 B2
(45) Date of Patent: Nov. 25, 2014

(54) NON-CONTACT GLASS SHEARING DEVICE AND METHOD FOR SCRIBING OR CUTTING A MOVING GLASS SHEET

(75) Inventors: Sean Matthew Garner, Elmira, NY (US); Xinghua Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 1282 days.

(21) Appl. No.: 12/288,751

(22) Filed: Oct. 23, 2008

(65) Prior Publication Data

US 2010/0102042 A1    Apr. 29, 2010

(51) Int. Cl.
| | |
|---|---|
| *B23K 26/00* | (2014.01) |
| *C03B 33/02* | (2006.01) |
| *C03B 33/08* | (2006.01) |
| *C03B 33/09* | (2006.01) |

(52) U.S. Cl.
CPC ......... *C03B 33/0215* (2013.01); *C03B 33/0222* (2013.01); *C03B 33/082* (2013.01); *C03B 33/093* (2013.01)
USPC ............ 219/121.68; 219/121.69; 219/121.76; 219/121.85

(58) Field of Classification Search
USPC ............... 219/121.67, 121.68, 121.69, 121.7, 219/121.71, 121.72; 264/400
See application file for complete search history.

(56) References Cited

U.S. PATENT DOCUMENTS

| | | | |
|---|---|---|---|
| 3,338,696 A | 8/1967 | Dockerty | |
| 3,453,097 A | 7/1969 | Hafner | |
| 3,682,609 A | 8/1972 | Dockerty | |
| 4,467,168 A | 8/1984 | Morgan et al. | 219/121 |
| 4,664,940 A | 5/1987 | Bensoussan et al. | 427/53.1 |
| 5,237,150 A | 8/1993 | Karube | 219/121.72 |
| 5,776,220 A | 7/1998 | Allaire et al. | 65/112 |
| 6,211,488 B1 | 4/2001 | Hoekstra et al. | 219/121.72 |
| 6,236,446 B1 * | 5/2001 | Izumi et al. | 349/187 |
| 6,252,197 B1 | 6/2001 | Hoekstra et al. | 219/121.84 |
| 6,322,958 B1 | 11/2001 | Hayashi | 430/495 |
| 6,407,360 B1 | 6/2002 | Choo et al. | 219/121.67 |
| 6,420,678 B1 | 7/2002 | Hoekstra | 219/121.75 |
| 6,501,047 B1 | 12/2002 | Xuan et al. | 219/121.69 |
| 6,590,181 B2 | 7/2003 | Choo et al. | 219/121.68 |
| 6,660,963 B2 | 12/2003 | Hoekstra et al. | 219/121.72 |
| 6,664,503 B1 | 12/2003 | Hsieh et al. | 219/121.72 |
| 6,723,952 B2 | 4/2004 | Choo et al. | 219/121.72 |
| 6,734,391 B2 * | 5/2004 | Jeon | 219/121.72 |
| 6,744,009 B1 | 6/2004 | Xuan et al. | 219/121.67 |
| 6,787,732 B1 | 9/2004 | Xuan et al. | 219/121.67 |
| 6,795,274 B1 | 9/2004 | Hsieh et al. | 360/135 |
| 6,800,831 B1 | 10/2004 | Hoetzel | 219/121.72 |
| 6,812,430 B2 | 11/2004 | Kang et al. | 219/121.72 |
| 6,919,531 B2 | 7/2005 | Worrall, III et al. | 219/121.69 |

(Continued)

FOREIGN PATENT DOCUMENTS

| | | |
|---|---|---|
| CN | 101121220 | 2/2008 |
| EP | 1238743 A1 | 9/2002 |
| WO | WO2007/119740 A1 | 10/2007 |

*Primary Examiner* — Mark Paschall
(74) *Attorney, Agent, or Firm* — Jeffrey A. Schmidt

(57) ABSTRACT

A non-contact glass shearing device and a method are described herein that vertically scribes or cuts a downward moving glass sheet to remove outer edges (beads) from the downward moving glass sheet. In addition, the non-contact glass shearing device and method can horizontally scribe or cut the downward moving glass sheet (without the outer edges) so that it can be separated into distinct glass sheets.

23 Claims, 13 Drawing Sheets

(56) References Cited

U.S. PATENT DOCUMENTS

| | | | |
|---|---|---|---|
| 6,992,026 B2 | 1/2006 | Fukuyo et al. | 438/797 |
| 7,026,573 B2 | 4/2006 | Worrall, III et al. | 219/121.72 |
| 7,128,250 B2 | 10/2006 | Luiz | 225/2 |
| 7,142,278 B2 | 11/2006 | Tatemura et al. | 349/158 |
| 7,750,266 B2 * | 7/2010 | Dane et al. | 219/121.6 |
| 7,772,522 B2 * | 8/2010 | Matsumoto et al. | 219/121.72 |
| 8,051,679 B2 * | 11/2011 | Abramov et al. | 65/112 |
| 8,518,280 B2 * | 8/2013 | Hsu et al. | 216/31 |
| 2008/0035617 A1 | 2/2008 | Fu et al. | 219/121.69 |
| 2008/0131651 A1 * | 6/2008 | Burdette et al. | 428/98 |
| 2008/0194079 A1 | 8/2008 | Yamamoto et al. | 438/462 |

* cited by examiner

NON-CONTACT GLASS SHEARING DEVICE AND METHOD FOR SCRIBING OR CUTTING A MOVING GLASS SHEET

TECHNICAL FIELD

The present invention relates in general to the glass manufacturing field, and in particular to a non-contact glass shearing device and a method that vertically scribes or cuts a downward moving glass sheet to remove outer edges (beads) from the downward moving glass sheet. In addition, the non-contact glass shearing device and method can horizontally scribe or cut the downward moving glass sheet so that it can be separated into distinct glass sheets.

BACKGROUND

Referring to FIG. 1 (PRIOR ART), there is shown a schematic view of an exemplary glass manufacturing system 100 which utilizes a fusion process to make a glass sheet 138. The fusion process is described, for example, in U.S. Pat. Nos. 3,338,696 and 3,682,609, the contents of which are incorporated herein by reference. As shown, the exemplary glass manufacturing system 100 includes a melting vessel 102, a fining vessel 104, a mixing vessel 106 (e.g., stir chamber 106), a delivery vessel 108 (e.g., bowl 108), a fusion draw machine (FDM) 110, and a traveling anvil machine (TAM) 112. Typically, the components 104, 106 and 108 are made from platinum or platinum-containing metals such as platinum-rhodium, platinum-iridium and combinations thereof, but they may also comprise other refractory metals such as molybdenum, palladium, rhenium, tantalum, titanium, tungsten, or alloys thereof.

The melting vessel 102 is where the glass batch materials are introduced as shown by arrow 114 and melted to form molten glass 116. The melting vessel 102 is connected to the fining vessel 104 (e.g., finer tube 104) by a melting to fining vessel connecting tube 113. The fining vessel 104 has a high temperature processing area that receives the molten glass 116 (not shown at this point) from the melting vessel 102 and in which bubbles are removed from the molten glass 116. The fining vessel 104 is connected to the mixing vessel 106 (e.g., stir chamber 106) by a finer to stir chamber connecting tube 118. And, the mixing vessel 106 is connected to the delivery vessel 108 by a stir chamber to bowl connecting tube 120. The delivery vessel 108 delivers the molten glass 116 through a downcomer 122 into the FDM 110 which includes an inlet 124, a forming vessel 126 (e.g., isopipe 126), and a pull roll assembly 128.

As shown, the molten glass 116 flows from the downcomer 122 into the inlet 124 which leads to the forming vessel 126 (e.g., isopipe 126) which is typically made from a ceramic or a glass-ceramic refractory material. The forming vessel 126 includes an opening 130 that receives the molten glass 116 which flows into a trough 132 and then overflows and runs down two lengthwise sides 134 (only one side shown) before fusing together at what is known as a root 136. The root 136 is where the two lengthwise sides sides 134 come together and where the two overflow walls of molten glass 116 rejoin (e.g., re-fuse) to form the glass sheet 138 which is then drawn downward by the pull roll assembly 128. The TAM 112 has a mechanical scoring device 146a (e.g., scoring wheel 146a) which mechanically scores and separates the drawn glass sheet 138 into distinct pieces of glass sheets 142. Thereafter, additional mechanical scoring and separation devices 146b and 146c (e.g., scoring wheels 146b and 146c) remove the outer edges 140a and 140b from the glass sheets 142 in subsequent processing steps. The removed outer edges 140a and 140b could be broken and collected within a pair of cullet bins 144a and 144b.

Unfortunately, the application of a mechanical scoring device 146a, 146b or 146c typically results in the formation of problematical chips due to the mechanical impact on the glass sheets 138 and 142. The chips could potentially contaminate the glass sheets 138 and 142. Likewise, the mechanical scoring devices 146a, 146b, or 146c or the mechanical separation process could produce stress concentrating defects along the formed edged and reduce the edge strength of final glass sheets 142. Furthermore, in the glass industry the glass sheets 138 and 142 will likely over time be getting thinner and thinner, which if this occurs then the physical impact of the mechanical scoring device 146a, 146b or 146c on the glass sheets 138 and 142 could shatter or significantly lower the strength of the glass sheets 138 and 142, resulting in the undesirable loss of material and lowered mechanical reliability. Thus, there is a need to address these problems and other problems which are associated with the use of mechanical devices 146a, 146b or 146c to scribe or cut glass sheets 138 and 142. These problems and other problems are solved by the present invention.

SUMMARY

In one aspect, the present invention provides a method for removing an outer edge from a moving glass sheet, where the method includes the steps of: (a) directing a first laser beam at the moving glass sheet to create a first starter defect in the moving glass sheet at a location spaced from an edge of the glass sheet; (b) directing a second laser beam at the first starter defect in the moving glass sheet; (c) directing a first stream of liquid at the first starter defect in the moving glass sheet, where the second laser beam and the first stream of liquid create a first vent in the moving glass sheet; and (d) maintaining the directing of the second laser beam and the first stream of liquid at the moving glass sheet even after the starter defect has passed to propagate the first vent in the moving glass sheet where the propagated first vent enables removal of the outer edge from the moving glass sheet. If desired, the method may also include steps to remove the other outer edge from the moving glass sheet and to horizontally scribe or cut the moving glass sheet.

In another aspect, the present invention provides a non-contact glass shearing device that includes: (a) a first laser mechanism that directs a first laser beam at the moving glass sheet to create a first starter defect in the moving glass sheet at a location spaced from an edge of the glass sheet; (b) the first laser mechanism further directs a second laser beam at the first starter defect in the moving glass sheet; (c) a first liquid jet that directs a first stream of liquid at the first starter defect in the moving glass sheet, where the second laser beam and the first stream of liquid create a first vent in the moving glass sheet; and (d) the first laser mechanism and the first liquid jet both maintain the directing of the second laser beam and the first stream of liquid at the moving glass sheet after the first starter defect has passed to propagate the first vent in the moving glass sheet where the propagated first vent enables removal of an outer edge from the moving glass sheet. The non-contact glass shearing device may also include another laser mechanism and liquid jet to remove the other outer edge from the moving glass sheet. If desired, the non-contact glass shearing device may also include yet another laser mechanism and liquid jet to horizontally scribe or cut the moving glass sheet.

In yet another aspect, the present invention provides a glass manufacturing system including: (a) at least one vessel for melting batch materials and forming molten glass; (b) a forming device for receiving the molten glass and forming a moving glass sheet; (c) a pull roll assembly for drawing the moving glass sheet; (d) a non-contact glass shearing device for removing an outer edge from a moving glass sheet, where the non-contact glass shearing device includes: (i) a first laser mechanism that directs a first laser beam at the moving glass sheet to create a first starter defect in the moving glass sheet at a location spaced from an edge of the glass sheet; (ii) the first laser mechanism further directs a second laser beam at the first starter defect in the moving glass sheet; (iii) a first liquid jet that directs a first stream of liquid at the first starter defect in the moving glass sheet, where the second laser beam and the first stream of liquid create a first vent in the moving glass sheet; and (iv) the first laser mechanism and the first liquid jet both maintain the directing of the second laser beam and the first stream of liquid at the moving glass sheet after the first starter defect has passed to propagate the first vent in the moving glass sheet where the propagated first vent enables removal of the outer edge from the moving glass sheet. The non-contact glass shearing device may also include another laser mechanism and liquid jet to remove the other outer edge from the moving glass sheet. If desired, the non-contact glass shearing device may also include yet another laser mechanism and liquid jet to horizontally scribe or cut the moving glass sheet.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be had by reference to the following detailed description when taken in conjunction with the accompanying drawings wherein.

DETAILED DESCRIPTION

Figure 1:
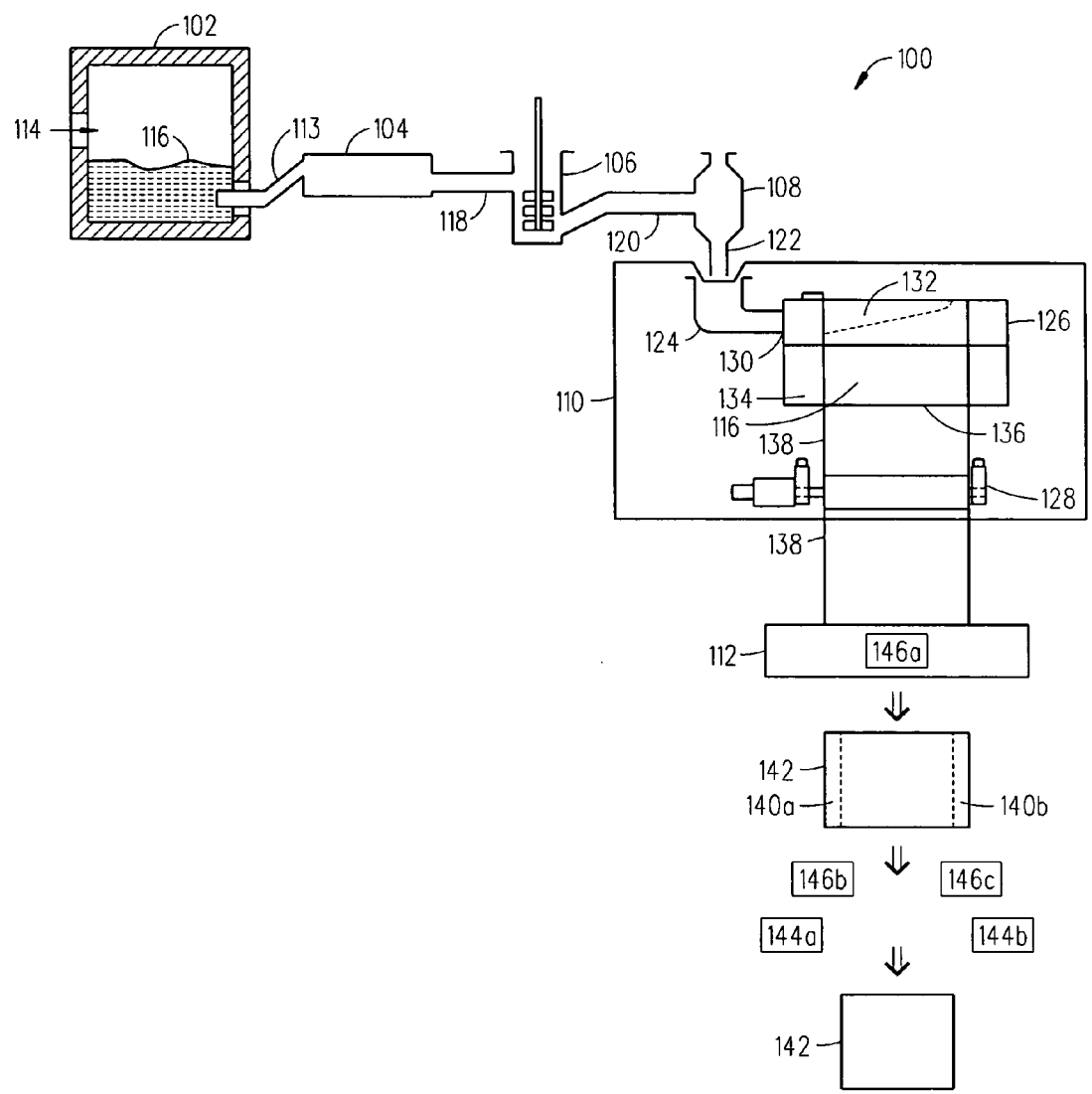
FIG. 1 (PRIOR ART) is a schematic view of an exemplary glass manufacturing system which utilizes a fusion process to make a glass sheet and also utilizes a mechanical scoring device to horizontally cut the glass sheet into distinct glass sheets and then two more mechanical scoring devices are used to remove the outer edges from the distinct glass sheets.
Figure 2:
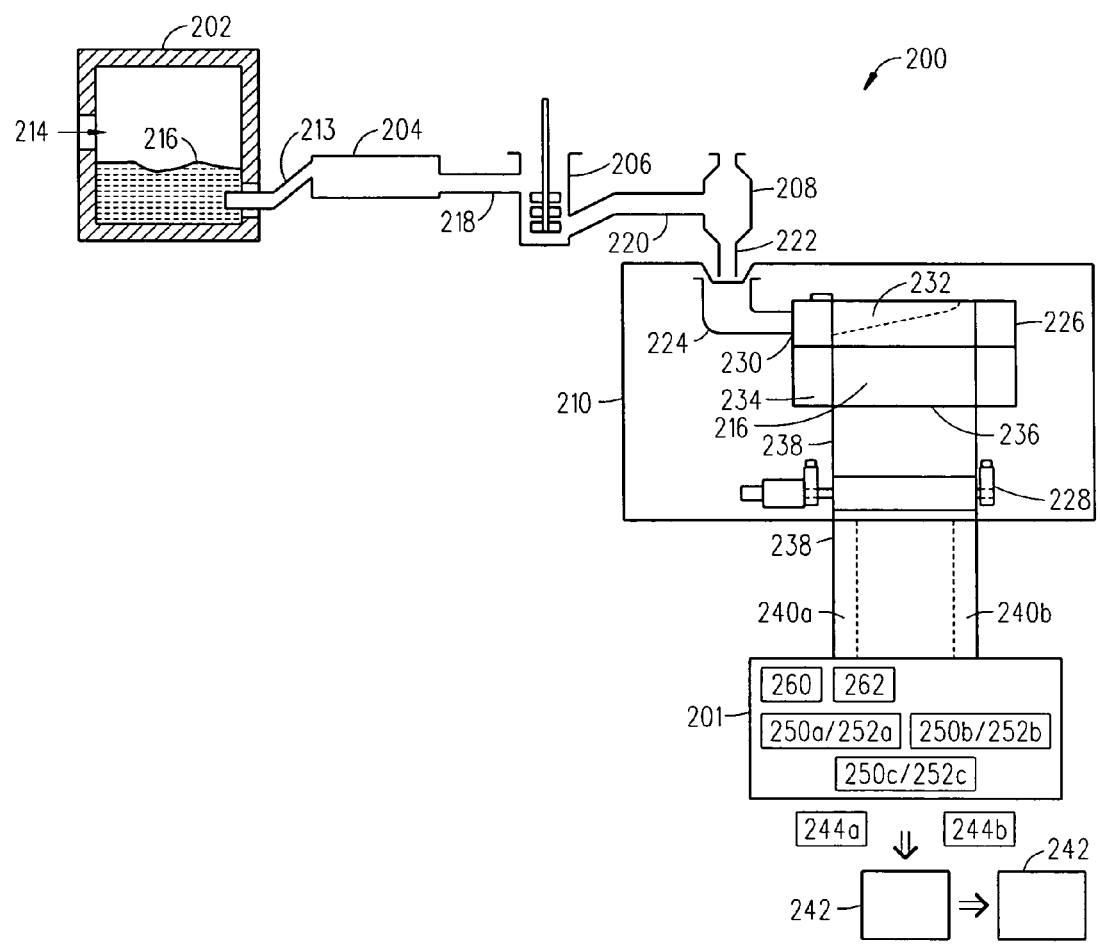
FIG. 2 is a schematic view of an exemplary glass manufacturing system which utilizes a non-contact glass shearing device to remove outer edges from the glass sheet and if desired to horizontally cut the glass sheet into distinct pieces of glass sheets in accordance with an embodiment of the present invention.

Referring to FIG. 2, there is shown a schematic view of an exemplary glass manufacturing system 200 which utilizes a non-contact glass shearing device 201 to scribe or cut a moving glass sheet 238 in accordance with an embodiment of the present invention. The non-contact glass shearing device 201 is configured to vertically scribe or cut the downward moving glass sheet 238 to remove the outer edges (beads) 240a and 240b from the downward moving glass sheet 238. If desired, the non-contact glass shearing device 201 can also horizontally scribe or cut the downward moving glass sheet 238 so that it can be separated into distinct glass sheets 242. Alternatively to cutting the glass sheet 238 into distinct glass sheets 242, the glass sheet 238 can also be handled, conveyed, and wound as a continuous thin glass web after removal of the outer edges 240a and 240b. However, prior to describing the non-contact glass shearing device 201 in detail a brief discussion is provided about the exemplary glass manufacturing system 200 which uses a fusion process to make the glass sheet 238. Although the glass manufacturing system 200 described herein uses the fusion process to make the glass sheet 238, it should be understood that the non-contact glass shearing device 201 could be incorporated into and used by any type of glass manufacturing system. For example, the non-contact glass shearing device 201 can be used in combination with fusion draw, slot draw, down draw, re-draw, float, and other glass and glass sheet forming methods that are either fully continuous, semi-continuous, or produce discrete lengths of glass sheet 238. Likewise the non-contact glass shearing device 201 could be operated as a separate independent unit while disconnected from a glass forming apparatus. Accordingly, the non-contact glass shearing device 201 of the present invention should not be construed in such a limited manner.

The exemplary glass manufacturing system 200 shown in FIG. 2 includes a melting vessel 202, a fining vessel 204, a mixing vessel 206 (e.g., stir chamber 206), a delivery vessel 208 (e.g., bowl 208), a FDM 210, and the non-contact glass shearing device 201. Typically, the components 204, 206 and 208 are made from platinum or platinum-containing metals such as platinum-rhodium, platinum-iridium and combinations thereof, but they may also comprise other refractory metals such as molybdenum, palladium, rhenium, tantalum, titanium, tungsten, or alloys thereof.

The melting vessel 202 is where the glass batch materials are introduced as shown by arrow 214 and melted to form molten glass 216. The melting vessel 202 is connected to the fining vessel 204 (e.g., finer tube 204) by a melting to fining vessel connecting tube 213. The fining vessel 204 has a high temperature processing area that receives the molten glass 216 (not shown at this point) from the melting vessel 202 and in which bubbles are removed from the molten glass 216. The fining vessel 204 is connected to the mixing vessel 206 (e.g., stir chamber 206) by a finer to stir chamber connecting tube 218. And, the mixing vessel 206 is connected to the delivery vessel 208 by a stir chamber to bowl connecting tube 220. The delivery vessel 208 delivers the molten glass 216 through a downcomer 222 into the FDM 210 which includes an inlet 224, a forming vessel 226 (e.g., isopipe 226), and a pull roll assembly 228.

As shown, the molten glass 216 flows from the downcomer 222 into the inlet 224 which leads to the forming vessel 226 (e.g., isopipe 226) which is typically made from a ceramic or a glass-ceramic refractory material. The forming vessel 226 includes an opening 230 that receives the molten glass 216 which flows into a trough 232 and then overflows and runs down the two lengthwise sides 234 (only one side shown) before fusing together at what is known as a root 236. The root 236 is where the two lengthwise sides 234 come together and where the two overflow walls of molten glass 216 rejoin (e.g., re-fuse) to form the glass sheet 238 which is then drawn downward by the pull roll assembly 228. The non-contact glass shearing device 201 then removes the outer edges (beads) 240a and 240b from the drawn glass sheet 238 and also separates the drawn glass sheet 238 into distinct pieces of glass sheets 242. In this embodiment, the outer edge 240a or 240b can be any variable width of the glass sheet 238. The removed outer edges 240a and 240b could be broken and then collected within a pair of cullet bins 244a and 244b.

The non-contact glass shearing device 201 includes a first laser mechanism 250a and a first liquid jet 252a which are used to remove or enable the removal of the outer edge 240a from the moving glass sheet 238 (see discussion related to FIGS. 3-8). In addition, the non-contact glass shearing device 201 includes a second laser mechanism 250b and a second liquid jet 252b which are used to remove or enable the removal of the outer edge 240b from the moving glass sheet 238. The second laser mechanism 250b and the second liquid jet 252b are essentially the same as the first laser mechanism 250a and first liquid jet 252a but are located on the opposite side of the moving glass sheet 238. If desired, the non-contact glass shearing device 201 also includes a third laser mechanism 250c and a third liquid jet 252c which are used to separate or enable the separation of the moving glass sheet 238 (without the outer edges 240a and 240b) into distinct pieces of glass sheets 242 (see discussion related to FIGS. 9-10). In one example, the first and second laser mechanisms 250a and 250b and their corresponding first and second liquid jets 252a and 252b are stationary while the third laser mechanism 250c and the third liquid jet 252c would be moved across the surface of the downward moving glass sheet 238. Alternatively to cutting the glass sheet 238 into distinct glass sheets 242, the glass sheet 238 can also be handled, conveyed, and wound as a continuous thin glass web after removal of the outer edges 240a and 240b.

Figure 3A:
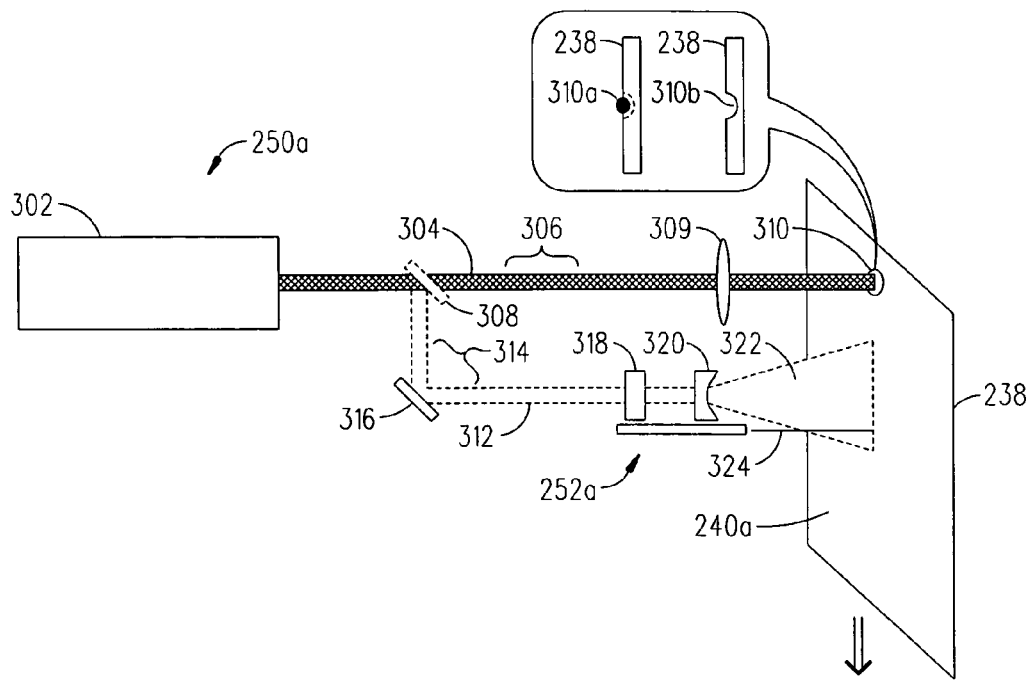
FIGS. 3A-3E are block diagrams of the non-contact glass shearing device shown in FIG. 2 at different points in time which are used to help explain how a first laser mechanism and a first liquid jet are used to remove or enable the removal of an outer edge from the moving glass sheet in accordance with an embodiment of the present invention.

Referring to FIGS. 3A-3E, there are block diagrams of the non-contact glass shearing device 201 at different points in time which are used to help explain how the first laser mechanism 250a and the first liquid jet 252a are used to remove or enable the removal of the outer edge 240a from the moving glass sheet 238 in accordance with an embodiment of the present invention. In FIG. 3A (time "a"), the first laser mechanism 250a includes a laser 302 that directs a first laser beam 304 along an ablation (defect initiation) path 306 by-passing a flip mirror 308 (fold mirror 308) which has been moved out of the way to enable the first laser beam 304 to pass through a plano-convex lens 309 (optional) and interface with the moving glass sheet 238 for a predetermined time to create a starter defect 310 within the moving glass sheet 238. The starter defect 310 can be either a residual stress field 310a or an ablation groove 310b (e.g., physical surface or internal defect 310b) in the moving glass sheet 238 depending on the power of the first laser beam 304. The residual stress field 310a would normally take less laser power density to create when compared to the laser power density that would be needed to create the ablation groove 310b.

Figure 3B:
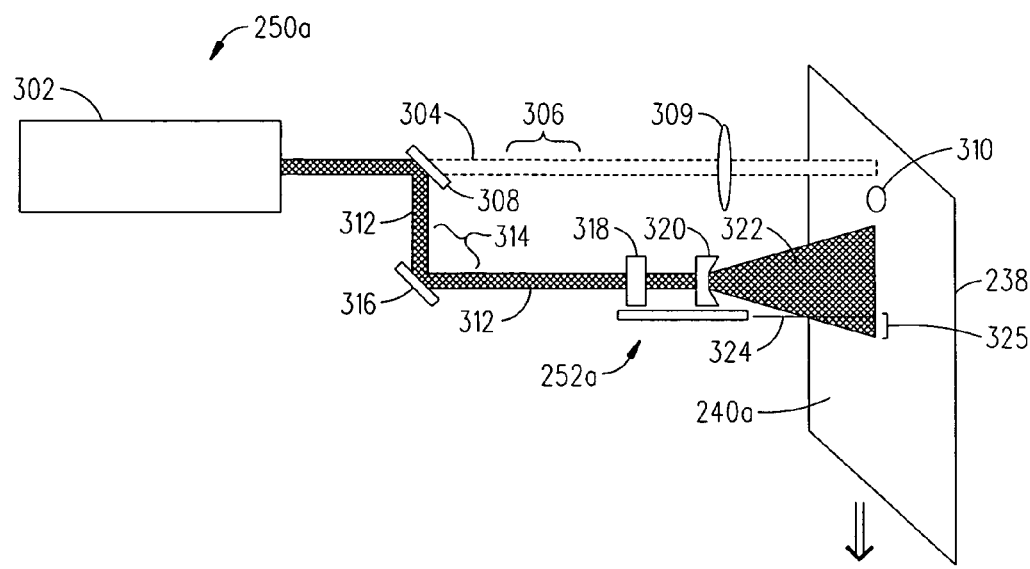

As shown in FIG. 3B (time "b"), once the starter defect 310 has been created and the glass sheet 238 is still moving in the downward direction then the laser 302 directs a second laser beam 312 towards the flip mirror 308 which has been moved so that the second laser beam 312 would be directed on a laser scoring path 314 (instead of on the ablation path 306) towards the moving glass sheet 238. In this example, the laser 302 directs the second laser beam 312 towards the flip mirror 308 which directs the second laser beam 312 towards a tilted mirror 316 which re-directs the second laser beam 312 through a plano-convex cylindrical lens 318 and a plano-concave cylindrical lens 320 (optional) which output an elongated laser beam 322 onto the moving glass sheet 238. To create this elongated laser beam 322, the position of lenses 318 and 320 can be interchanged if desired. The first liquid jet 252a also directs a stream of liquid 324 towards the moving glass sheet 238 where the liquid 324 is typically located either within or below the bottom 325 (trailing edge 325) of the elongated laser beam 322.

Figure 3C:
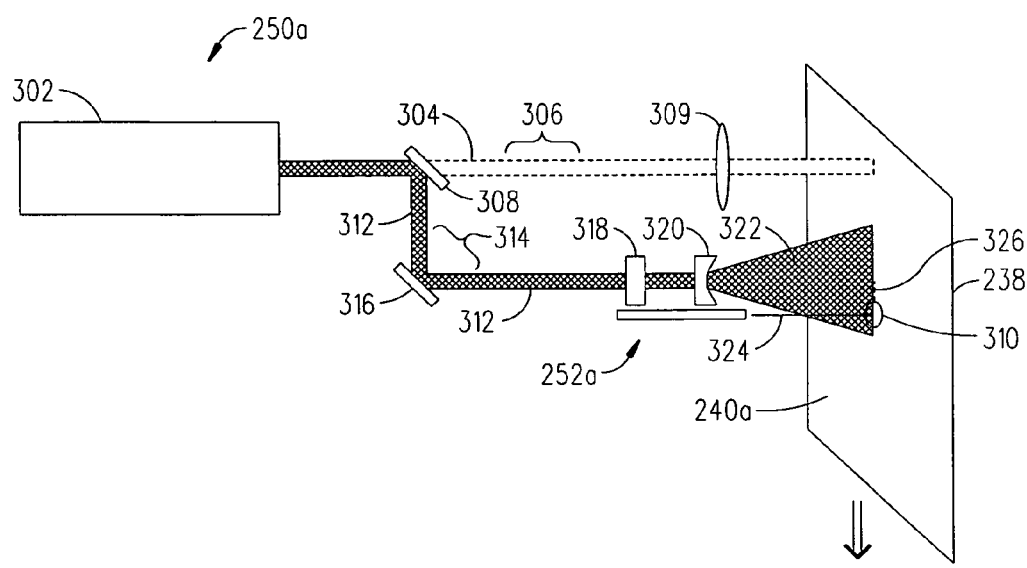

In FIG. 3C (time "c"), the moving glass sheet 238 has moved such that elongated laser beam 322 and stream of liquid 324 are now directed at the starter defect 310 to create a vent 326 in the moving glass sheet 238. In particular, the elongated laser beam 322 heats the moving glass sheet 238 and the stream of liquid 324 cools the moving glass sheet 238 such that the starter defect 310 forms the vent 326 which can have varying depths within the moving glass sheet 238 (see FIGS. 5-6). The first liquid jet 252a or an additional liquid jet could be alternatively located on the opposite side of the moving glass sheet 238 when compared to the location of the first laser 302. In this configuration the elongated laser beam 322 and stream of liquid 324 are incident on opposite faces of the glass sheet 238.

Figure 3D:
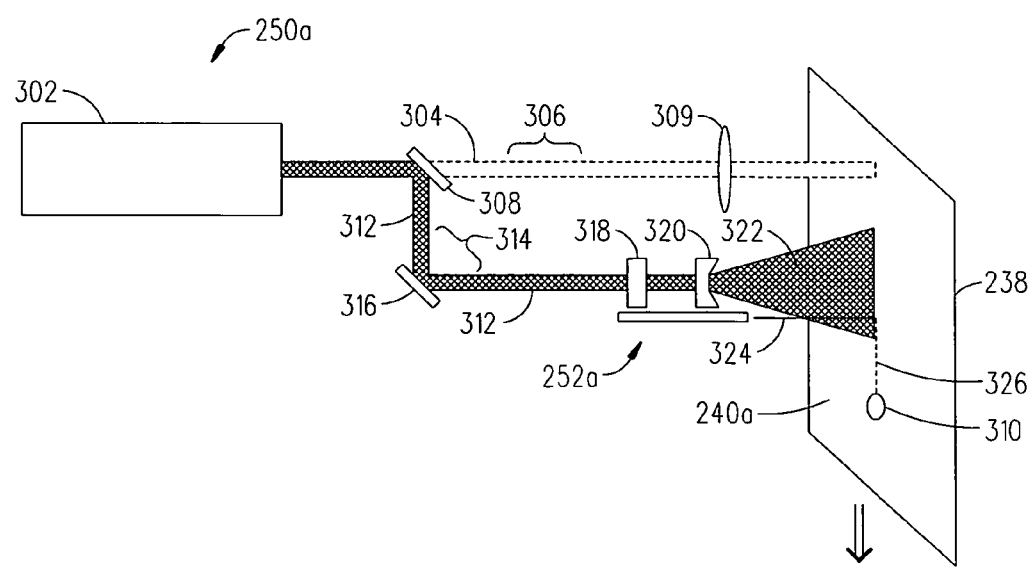

In FIG. 3D (time "d"), the moving glass sheet 238 has continued to move in the downward direction such that the starter defect 310 has passed by the elongated laser beam 322 and the stream of liquid 324. The laser 302 and the first liquid jet 252a continue to direct the elongated laser beam 322 and the stream of liquid 324 at the moving glass sheet 238 to propagate the vent 326 within the moving glass sheet 238 where the propagated vent 326 enables the removal of the outer edge 240a from the moving glass sheet 238. For instance, the propagated vent 326 can be a scribe in which case a device (not shown) can be used to press-on and bend the outer edge 240a so as to mechanically separate the outer edge 240a from the moving glass sheet 238. Alternatively, the propagated vent 326 can be a full-body cut in which case the separated outer edge 240a with or without the aid of another device (not shown) can be directed to the cullet bin 244a (see FIG. 2).

Figure 3E:
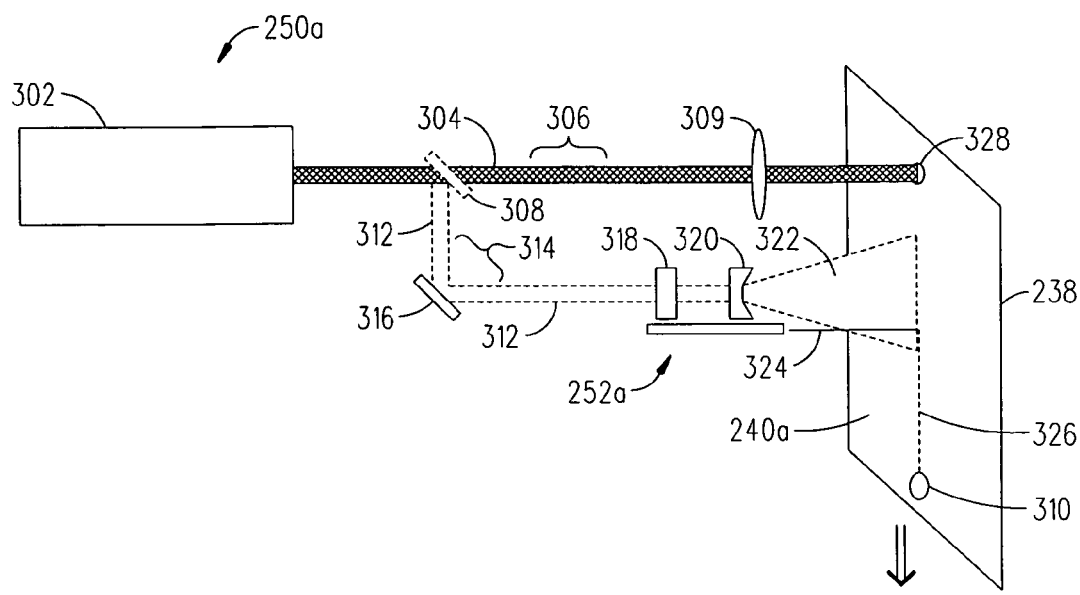

In FIG. 3E (time "e"), the laser 302 may direct the first laser beam 304 along the ablation (defect initiation) path 306 bypassing the flip mirror 308 which had been moved out of the way to enable the first laser beam 304 to pass through the plano-convex lens 309 (optional) onto the moving glass sheet 238 to create another defect 328 within the moving glass sheet 238. The defect 328 (which can be smaller than the first starter defect 310) helps control a direction of the propagated vent 326 in the moving glass sheet 238. Once, the defect 328 is made the laser 302 would direct the elongated laser beam 322 towards the moving glass sheet 238 to maintain the propagation of the vent 326 along a desired direction within the moving glass sheet 238. If needed, the laser 302 may be used to periodically create additional defects 328 when desired to help control the direction of the propagated vent 326 within the moving glass sheet 238.

In this exemplary configuration, the laser mechanisms 250*a* and 250*b* produce a glass shearing process continuously or semi-continuously in the vertical direction. In other configurations of glass forming methods, the continuous glass motion might be horizontal or at a discrete inclined angle instead of vertically like in the manufacturing system 200. In this case, the laser mechanisms 250*a* and 250*b* could likewise produce a continuous or semi-continuous shearing process in these alternate directions of continuous glass forming. Likewise the additional laser mechanism 250*c* could produce a glass shearing process in the direction across the width of the drawn glass sheet 238 even if the continuous drawn glass sheet 238 motion is other than vertical. The multiple glass shearing processes mentioned could also be performed by a single or multiple laser mechanisms (compare FIGS. 3 and 8-10). Likewise a single shearing process or multiple (two or more) shearing processes could be conducted in the direction of drawn glass sheet 238 motion.

In one embodiment, the first laser 302 can be a compact $CO_2$ laser 302, preferably a radio-frequency (RF) excited $CO_2$ laser 302, which is one of the least expensive, industrialized lasers available. Most of the commercially available $CO_2$ lasers operate at a 10.6 um wavelength. At this wavelength, the glass sheets 238 which are typically used for active matrix liquid crystal display (AMLCD) applications absorb strongly, with an absorption coefficient k of the order of $10^5$ $m^{-1}$ or higher. In this case, the interaction of the laser radiation with the glass sheet 238 is limited to the surface. Hence, the $CO_2$ laser 302 acts like a surface heater, where the transfer of heat to the bulk of the glass sheet 238 can only be achieved by thermal conduction.

Thus, the interaction of the laser beam 304 (for example) with the glass sheet 238 depends on absorption and light power density. A focused laser beam 304, given enough power density, will heat up the glass sheet 238 locally to create for instance the residual stress field 310*a* (see FIG. 3A). At even higher power densities, the laser beam 304 will heat up the glass sheet 238 locally to create the ablation groove 310*b* (e.g., physical surface or internal defect 310*b*) irrespective of the laser mode of operation, pulsed or continuous-wave (CW) (see FIG. 3A). For glass sheets 238 such as EAGLE XG® which can be used for AMLCD applications, the onset of laser ablation for an RF $CO_2$ laser 302 running at 5 kHz repetition rate occurs at a peak power density of 20 kW/cm². The peak power density is defined as:

$$I = \frac{2P}{\pi w^2},$$

for a laser beam 304 with a Gaussian intensity profile. In the above equation P is the incident power, and w is the beam radius at the $1/e^2$ point. The ablation threshold can be easily surpassed with a low-power $CO_2$ laser 302 and a short focal length plano-convex lens 309.

The laser ablation process manifests itself in the loss of material through vaporization. When a $CO_2$ laser 302 is used to ablate the glass sheet 238, the starter defect 310*b* with a groove of certain depth is obtained as the laser beam 304 is moved on the glass sheet 238. In most cases, a residual stress field with varying magnitude is also created around the vicinity of the laser ablated starter defect 310*b* (laser ablated groove 310*b*).

To demonstrate the present invention the inventors have built and tested a first laser mechanism 250*a* and a first liquid jet 252*a* having a low-power $CO_2$ laser 302 and an integrated laser defect initiation and laser liquid jet thermal shock cutting. FIGS. 3A-3E illustrate the setup of the first laser mechanism 250*a* and the first liquid jet 252*a* which was used in this particular demonstration to test the present invention. In particular, the laser 302 used in the defect initiation and scoring setup was a 5 kHz, 12 W RF $CO_2$ laser (Synrad 48-1). The flip mirror 308 was used to direct the laser beam 312 to the laser scoring path 314 when it is in the path of the laser beam 312 (see FIGS. 3B-3D). When the flip mirror 308 was flipped out of the laser scoring path 314, then the laser beam 304 propagated along the ablation (defect initiation) path 306 (see FIGS. 3A and 3E).

In the ablation path 306, a plano-convex lens 309 was used to focus the laser beam 304. Due to the low power of the laser 302 used at this time, a short focal length plano-convex lens 309 with a 2" focal length was used such that the focal spot size would be small enough and the fluence level high enough to start the laser ablation process and create the starter defect 310*b*. Preferably, the ablated starter defect 310*b* has a groove that is oriented in the same direction of the laser scoring path 314. The other orientation of the starter defect 310*b* can be used if desired. In the arrangement shown in FIGS. 3A-3E, the starter defect 310 was located on the same side of the moving glass sheet 238 with respect to the laser scoring beam 312 and liquid stream 324.

In the laser scoring path 314, a 4" plano-convex cylindrical lens 318 was used to focus the second laser beam 312 in the scoring axis while a 2" plano-concave cylindrical lens 320 was used to expand the second laser beam 312 in the perpendicular axis to form the elongated laser beam 322. The power of the elongated laser beam 322 on the glass sheet 238 was roughly 11 W. The elongated laser beam 322 was adjusted to be slightly out of focus by lens 318 and was roughly 9 mm long and ~0.4 mm wide. The liquid jet 252*a* emitted a deionized water jet 324 from a sapphire orifice (Gatti, Incorporated) with a diameter of 0.003" or 0.006". The distance of the water jet 324 to the rear (trailing edge) of the elongated laser beam 322 can vary depending on the diameter of the jet orifice as well as the position of the starter defect 310 on the glass sheet 238.

An exemplary sequence of cutting or removing the outer edge 240*a* of the moving glass sheet 238 using first laser mechanism 250*a* and the first liquid jet 252*a* is described next. First the flip mirror 308 was moved out of the way to open the ablation path 306 and the laser 302 had a power set that was at the level needed for generating a starter defect 310. Next, the motion of the glass sheet 238 was initiated and the laser 302 emitted the first laser beam 304 to form a short starter groove 310 on the surface of the moving glass sheet 238. Then, the flip mirror 308 was flipped into the ablation path 306 and the laser 302 emitted a second laser beam 312 (which has more power than the first laser beam 304), incident on the tilted mirror 316 into the lenses 318 and 320 which output the elongated laser beam 322 onto the moving glass sheet 238. As the glass sheet 238 moved, the defect 310 moved into and then out of the elongated laser beam 322. The glass sheet 238 was heated by the elongated laser beam 322 and subsequently quenched with a water jet 324. At this time, the tension caused by the laser generated starter defect 310b creates-propagates a vent 326 within the moving glass sheet 238. Propagation of the vent 326 only occurred when starting at the starter defect 310. In the case described here, the same $CO_2$ laser was used to both generate the starter defect 310 (e.g., defect 310, initiator 310) as well as propagate the vent 326 (see FIGS. 8A-8E for an alternative set-up). Propagation of the controlled vent 326 (e.g., glass score 326) can be stopped by either blocking the elongated laser score beam 322 or the source of the cooling liquid 324 (e.g., water jet).

The glass sheets 238 used in these demonstrations were standard 0.635 mm thick Corning EAGLE XG® glass sheets 238 and also EAGLE XG® composition glass sheets 238 formed to a thickness of roughly 200 um. Glass sheets 238 which are 0.635 mm thick are widely used in the glass industry for AMLCD applications. For comparison to the data below, tests using a laser scoring setup described above but with a mechanical starter defect, a speed of 12 mm/s and a vent depth of more than 50% of the substrate thickness was typically obtained. The examples below are for laser formed starter defects 310 and no particular effort during these tests was directed to optimizing the cutting operation.

In these demonstrations, a $CO_2$ laser 302 was used to ablate a starter defect 310b (starter groove 310b) off the edge and on the surface of a moving glass sheet 238. The laser ablated starter defect 310b was then used as a defect initiator in the laser scoring step. Under these conditions, optimum vent 326 propagation speed was obtained when the water jet 324 was located inside the elongated laser scoring beam 322, roughly 2 mm from the trailing edge. Refer to FIG. 3C for the arrangement of the laser ablated starter defect 310b, the elongated laser scoring beam 322, and the water jet 324 location.

Figure 4:
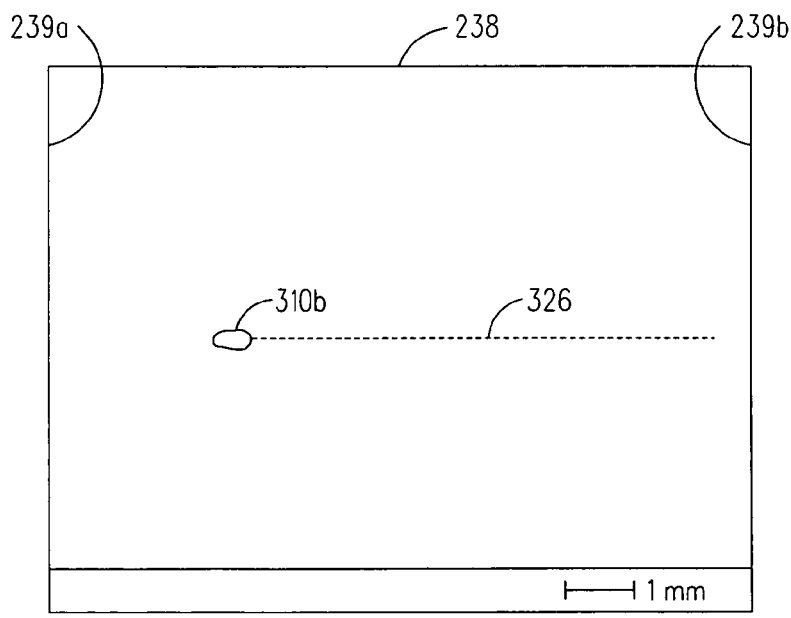
FIGS. 4-7 are various diagrams and graphs which illustrate the results of experiments which were conducted to test the first laser mechanism and the first liquid jet shown in FIGS. 3A-3E in accordance with an embodiment of the present invention.

In one particular example, a $CO_2$ laser beam 304 of 7.9 W was used to ablate a short starter defect 310b (starter groove 310b) of roughly 1 mm in length on a glass sheet 238 moving at a speed of 5 mm/s. Afterwards the laser generated starter defect 310b passed through the elongated laser scoring beam 322 and the water jet 324 emitted from a 0.003" sapphire orifice. The propagation of the resulting vent 326 was observed originating from the laser ablated starter defect 310b (starter groove 310b). FIG. 4 is a diagram of a piece of glass sheet 238 (with glass edges 239a and 239b) which went through the ablation and scoring steps. The laser ablated starter defect 310b (starter groove 310b) is shown in the left of the diagram. The laser generated vent 326 from the scoring step is shown as the horizontal line in the diagram to the right center.

Figure 5:
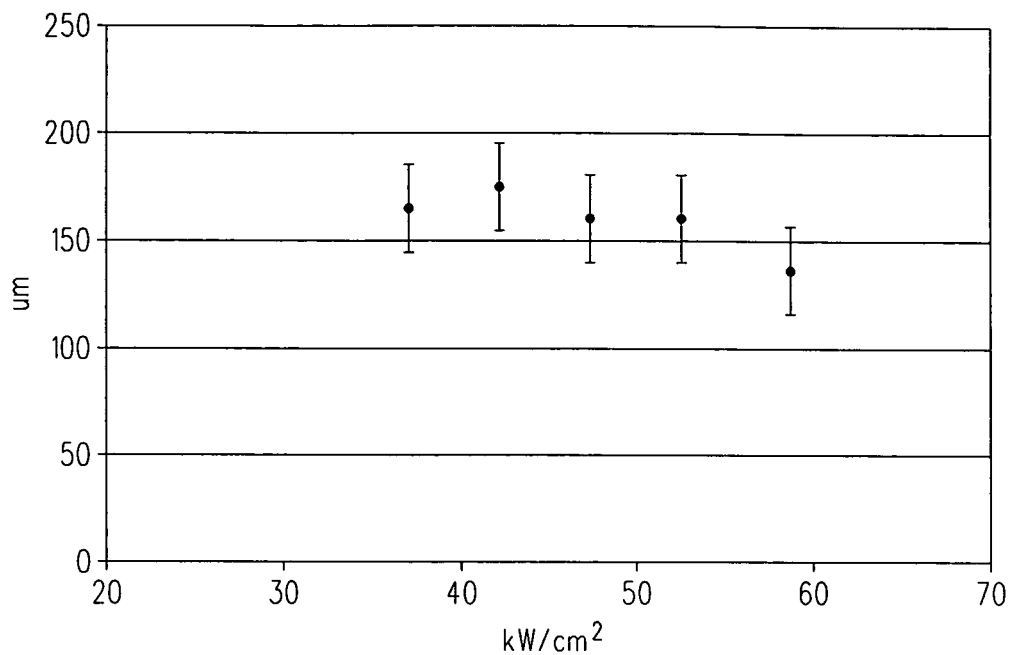

The depth of the vent 326 created by laser scoring was estimated by using an optical microscope after breaking the glass sheet 238. FIG. 5 shows a plot of vent depth in µm (y axis) versus the laser fluence in kW/cm² (x-axis) used to ablate the starter groove 310b at a laser scoring speed of 5 mm/s. Based on FIG. 5, the depth of the vent 326 did not change as the laser fluence was increased to ~50 kW/cm². Further increases in the laser fluence to roughly 60 kW/cm² resulted in a somewhat shallower depth of the vent 326. This could be attributed to the laser ablation which generates compressive stress in the starter groove 310b, which is counteracting on the tensile stress of the laser scoring step. Since high laser fluence can result in significant melting, debris and defect generation on the glass sheet 238, it is advantageous to keep the laser fluence in a range of about 5 kW/cm² to 70 kW/cm², preferably less than 70 kW/cm², and more preferably less than 50 kW/cm² for defect initiation purposes.

Figure 6:
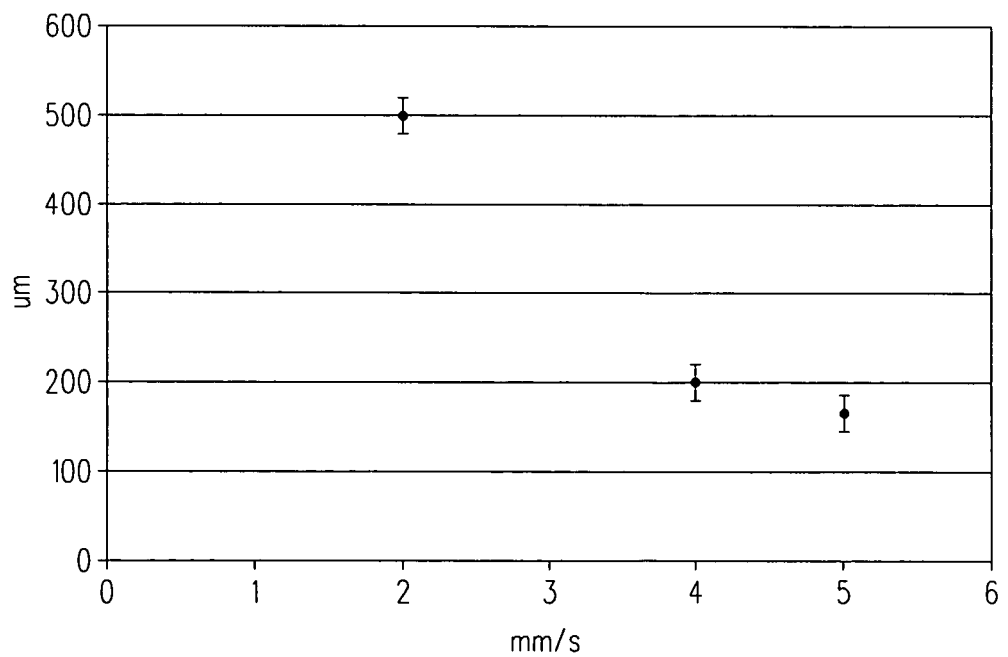

The correlation of the vent depth versus speed of motion of the glass sheet 238 was also investigated in these demonstrations. In FIG. 6, there is a plot of vent depth in µm (y axis) versus the scoring speed in mm/s (x-axis) at a laser fluence of 37 kW/cm² indicating the results of these demonstrations. As can be seen, the vent depth increases with the decreasing speed of the glass sheet 238. A full-body (0.635 mm) separation was observed at a speed of 1 mm/s while using the 7.9 W laser scoring beam power when emitting the elongated laser beam 322 onto the moving glass sheet 238. Using a higher power laser beam 322 is believed to enable an increase in the scoring speed for any given vent depth.

Figure 7:
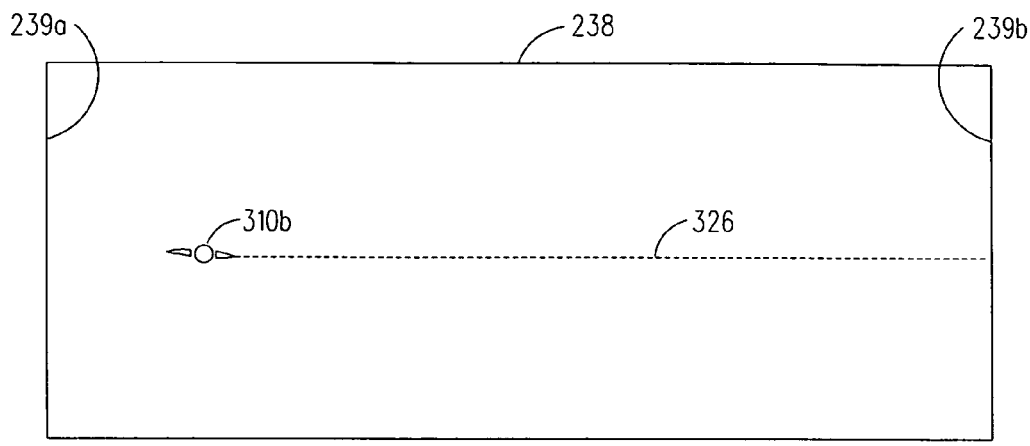

In another example, an EAGLE XG® glass sheet 238 approximately 0.2 mm thick was cut with the $CO_2$ laser 302 and the water jet 252a approach in accordance with the present invention. In this experiment, the beam expanding plano-concave cylindrical lens 320 was not used. The elongated laser beam 322 was roughly 6 mm long and ~0.9 mm wide. The distance of the front edge of the water jet 252a to the rear (trailing edge) of the elongated laser beam was roughly 2 mm. In FIG. 7, there is presented an image of a piece of the 0.2 mm thick glass sheet 238 (with edges 239a and 239b) that was cut with the $CO_2$ laser and water jet approach of the present invention. The thickness of the glass sheet 238 was roughly 210 um. A through hole of roughly 100 um in diameter was formed with 1000 $CO_2$ laser pulses when the glass sheet 238 was stationary and the $CO_2$ laser 302 was running at 6.5 W. This through hole was used as the defect starter 310 in the subsequent laser scoring step. At a cutting speed of 25 mm/s, full-body separation was achieved.

Figure 8A:
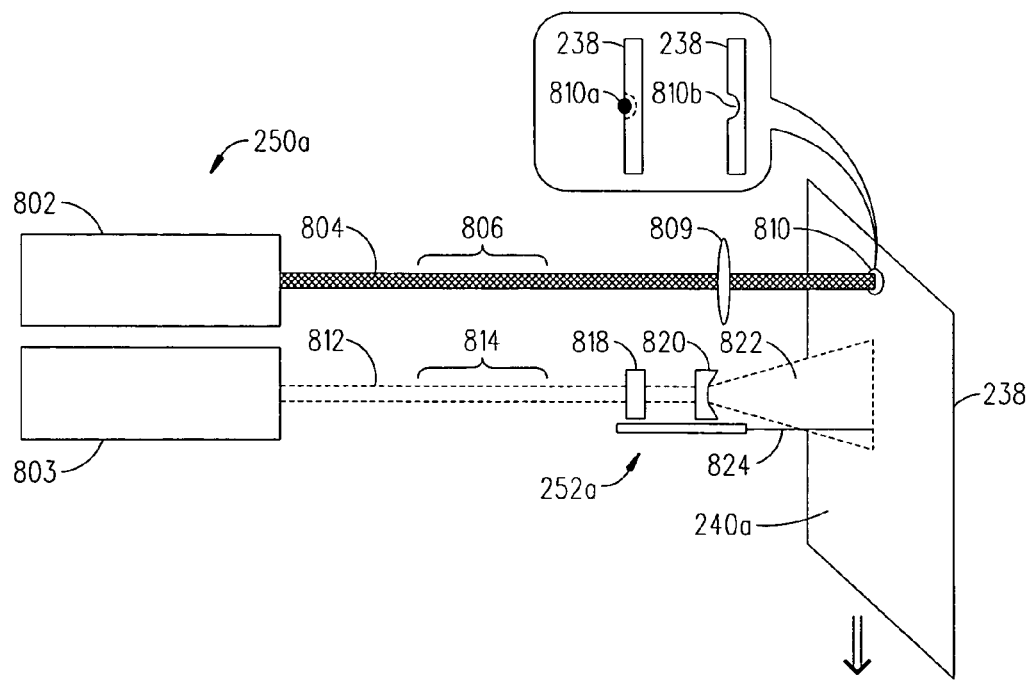
FIGS. 8A-8E are block diagrams of the non-contact glass shearing device shown in FIG. 2 at different points in time which are used to help explain how another configuration of the first laser mechanism and the first liquid jet are used to remove or enable the removal of an outer edge from the moving glass sheet in accordance with an embodiment of the present invention.

Referring to FIGS. 8A-8E, there are block diagrams of the non-contact glass shearing device 201 at different points in time which are used to help explain how another configuration of the first laser mechanism 250a and the first liquid jet 252a are used to remove or enable the removal of the outer edge 240a from the moving glass sheet 238 in accordance with an embodiment of the present invention. In FIG. 8A (time "a"), the first laser mechanism 250a includes a first laser 802 that directs a first laser beam 804 along an ablation (defect initiation) path 806 through a plano-convex lens 809 (optional) so as to interface with the moving glass sheet 238 for a predetermined time to create a starter defect 810 within the moving glass sheet 238. The starter defect 810 can be either a residual stress field 810a or an ablation groove 810b in the moving glass sheet 238 depending on the power of the first laser beam 804. The residual stress field 810a would normally take less laser power density to create when compared to the laser power density that would be needed to create the ablation groove 810b.

Figure 8B:
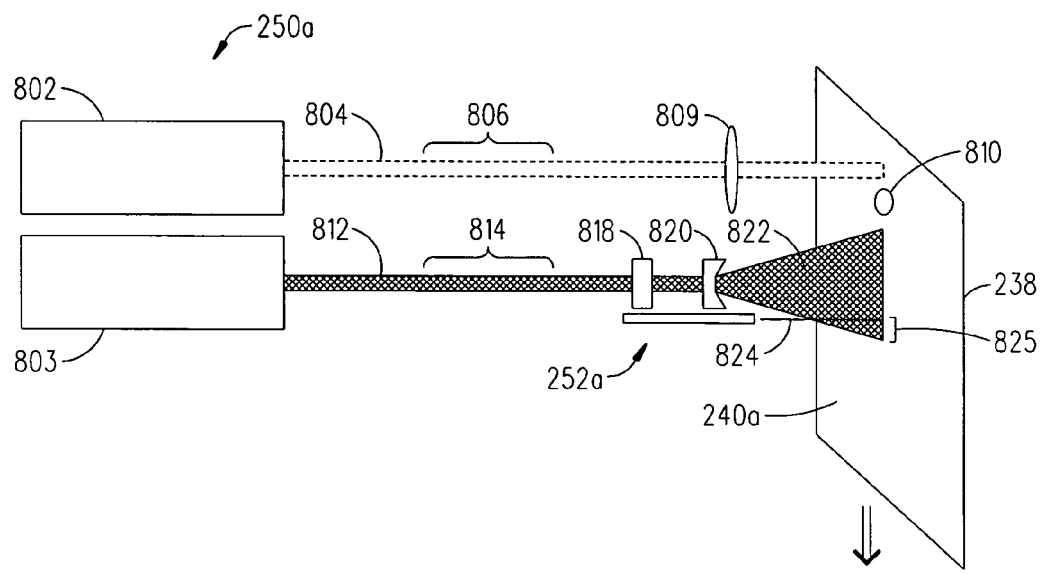

As shown in FIG. 8B (time "b"), once the starter defect 810 has been created and the glass sheet 238 is still moving in the downward direction then a second laser 803 directs a second laser beam 812 on a laser scoring path 814 towards the moving glass sheet 238. The first laser 802 is not operating at this point in time. In this example, the second laser 803 directs the second laser beam 812 through a plano-convex cylindrical lens 818 and a plano-concave cylindrical lens 820 (optional) which output an elongated laser beam 822 onto the moving glass sheet 238. To create this elongated laser beam 822, the position of lenses 818 and 820 can be interchanged if desired. The first liquid jet 252a also directs a stream of liquid 824 towards the moving glass sheet 238 where the liquid 824 is typically located either within or below the bottom 825 (trailing edge 825) of the elongated laser beam 822.

Figure 8C:
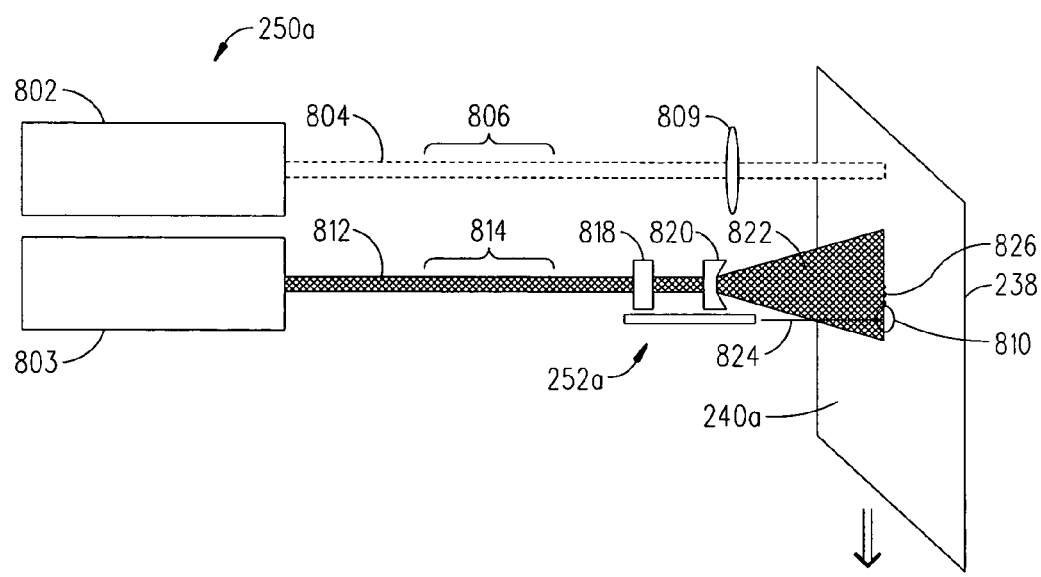

In FIG. 8C (time "c"), the moving glass sheet 238 has moved such that the elongated laser beam 822 and stream of liquid 824 are now directed at the starter defect 810 to create a vent 826 in the moving glass sheet 238. In particular, the elongated laser beam 822 heats the moving glass sheet 238 and the stream of liquid 824 cools the moving glass sheet 238 such that the starter defect 810 forms the vent 826 which can have varying depths within the moving glass sheet 238 (see FIGS. 5-6). The first liquid jet 252a or an additional liquid jet could be alternatively located on the opposite side of the moving glass sheet 238 when compared to the location of the second laser 803. In this configuration the elongated laser beam 822 and stream of liquid 824 are incident on opposite faces of the glass sheet 238.

Figure 8D:
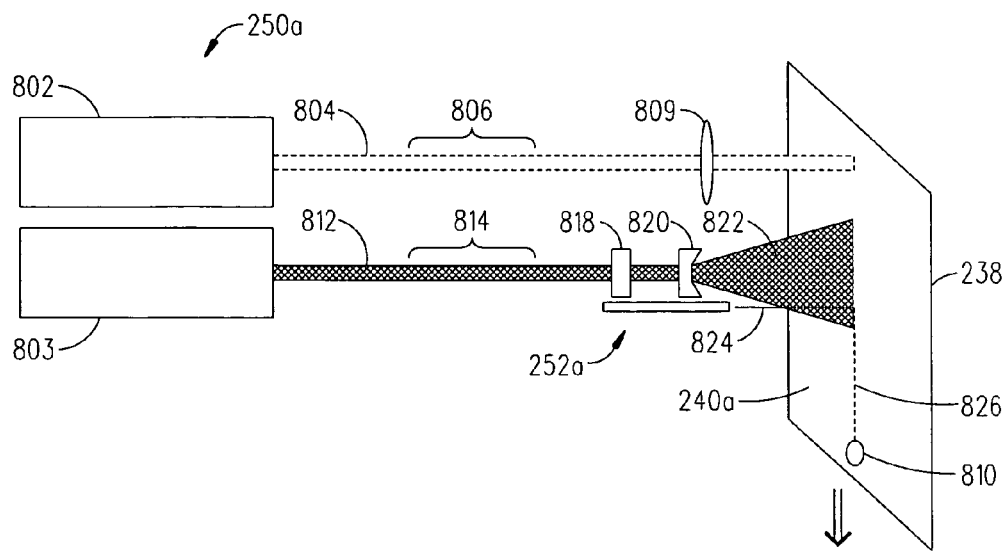

In FIG. 8D (time "d"), the moving glass sheet 238 has continued to move in the downward direction such that the starter defect 810 has passed by the elongated laser beam 822 and the stream of liquid 824. The second laser 803 and the first liquid jet 252a continue to direct the elongated laser beam 822 and the stream of liquid 824 at the moving glass sheet 238 to propagate the vent 826 within the moving glass sheet 238 where the propagated vent 826 enables the removal of the outer edge 240a from the moving glass sheet 238. For instance, the propagated vent 826 can be a scribe in which case a device (not shown) can be used to press-on and bend the outer edge 240a so as to separate the outer edge 240a from the moving glass sheet 238. Alternatively, the propagated vent 826 can be a full-body cut in which case the separated outer edge 240a with or without the aid of another device (not shown) can be directed to the cullet bin 244a (see FIG. 2).

Figure 8E:
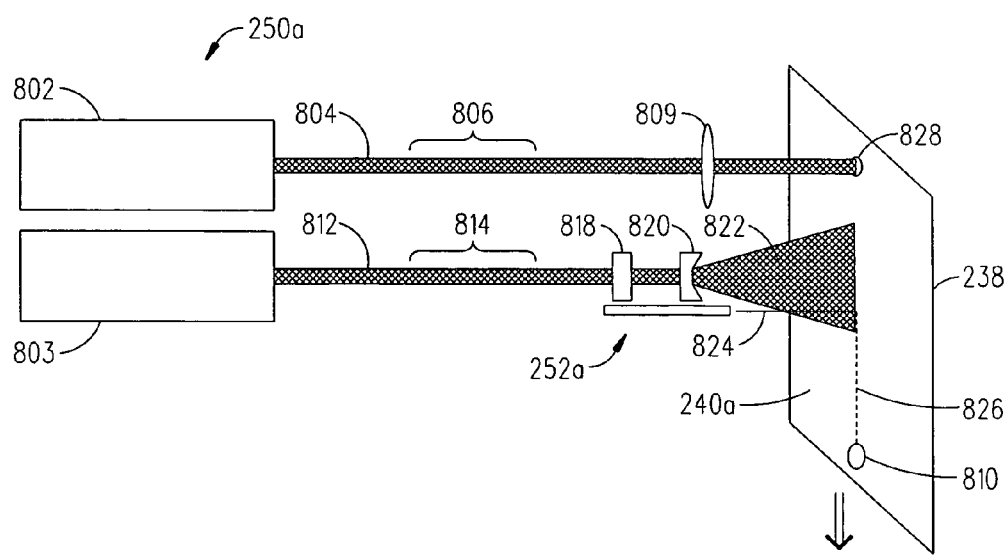

In FIG. 8E (time "e"), the first laser 802 may direct the first laser beam 804 along the ablation (defect initiation) path 806 and through the plano-convex lens 809 (optional) onto the moving glass sheet 238 to create another defect 828 within the moving glass sheet 238. The defect 828 (which can be smaller than the first starter defect 810) helps control a direction of the propagated vent 826 in the moving glass sheet 238. At this time, the second laser 803 would still be directing the elongated laser beam 822 towards the moving glass sheet 238 to maintain the propagation of the vent 826 along a desired direction within the moving glass sheet 238. If needed, the first laser 802 may be used to periodically create additional defects 828 when desired to help control the direction of the propagated vent 826 within the moving glass sheet 238.

It should be appreciated that the second laser mechanism 250b and the second liquid jet 252b are essentially the same and operate the same as the first laser mechanism 250a and first liquid jet 252a except that they are located on the opposite side of the moving glass sheet 238 (see FIG. 2). Thus, for brevity a detailed discussion is not provided herein about how the second laser mechanism 250b and the second liquid jet 252b can be used to enable the removal of the other outer edge 240b from the moving glass sheet 238.

Figure 9A:
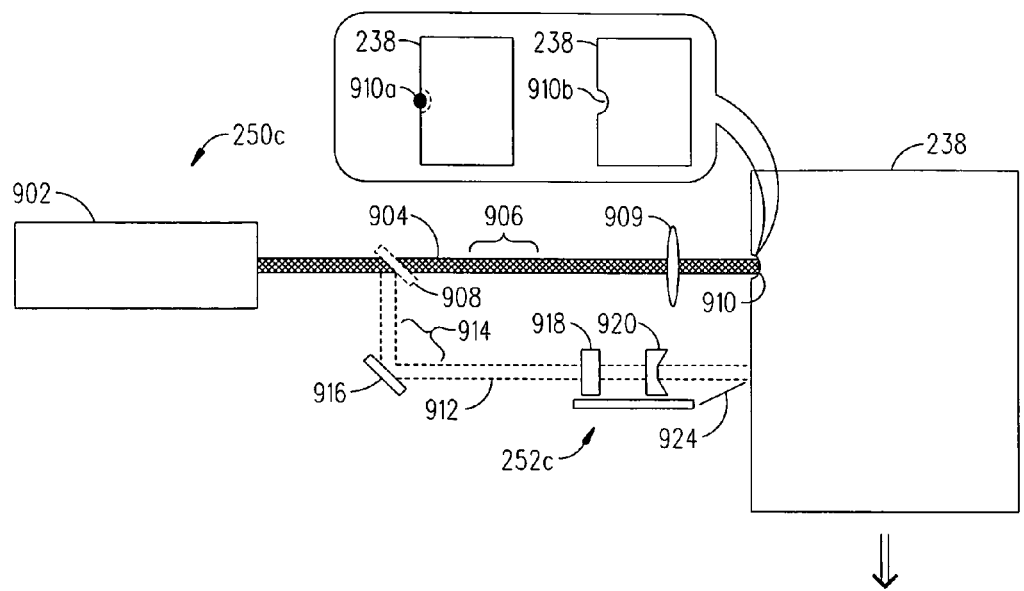
FIGS. 9A-9D are block diagrams of the non-contact glass shearing device shown in FIG. 2 at different points in time which are used to help explain how yet another laser mechanism and liquid jet are used to separate or enable the separation of the moving glass sheet (without the outer edges) into distinct pieces of glass sheets in accordance with an embodiment of the present invention.

Referring to FIGS. 9A-9D, there are block diagrams of the non-contact glass shearing device 201 at different points in time which are used to help explain how the third laser mechanism 250c and the third liquid jet 252c are used to separate or enable the separation of the moving glass sheet 238 (without the outer edges 240a and 240b) into distinct pieces of glass sheets 242 in accordance with an embodiment of the present invention. Alternatively to cutting the glass sheet 238 into distinct glass sheets 242, the glass sheet 238 can also be handled, conveyed, and wound as a continuous thin glass web after removal of the outer edges 240a and 240b. In FIG. 9A (time "f"), the third laser mechanism 250c includes a laser 902 that directs a first laser beam 904 along an ablation (defect initiation) path 906 by-passing a flip mirror 908 (fold mirror 908) which has been moved out of the way to enable the first laser beam 904 to pass through a plano-convex lens 909 (optional) and interface with the moving glass sheet 238 for a predetermined time to create a starter defect 910 on the edge (as shown) or off the edge (if desired) within the moving glass sheet 238. The starter defect 910 can be either a residual stress field 910a or an ablation groove 910b in the moving glass sheet 238 depending on the power of the first laser beam 904. The residual stress field 910a would normally take less laser power density to create when compared to the laser power density that would be needed to create the ablation groove 910b.

Figure 9B:
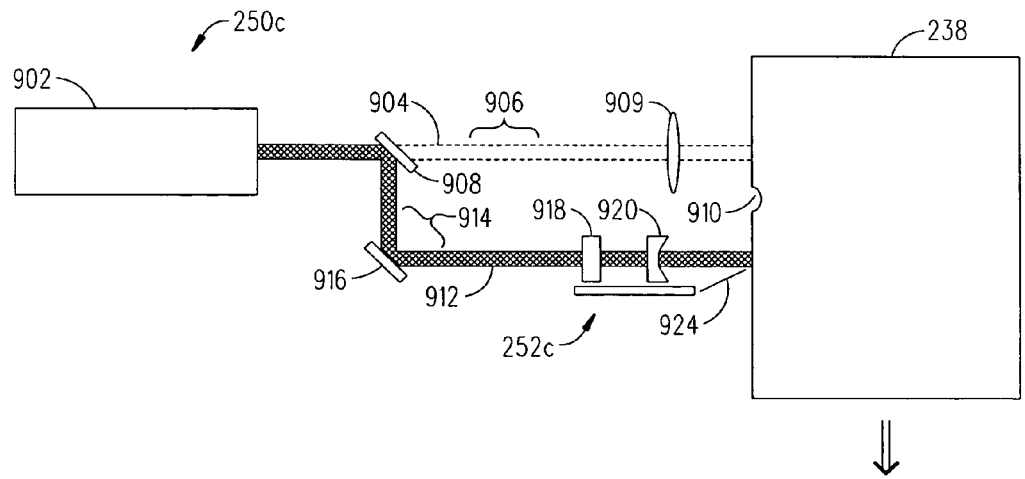

As shown in FIG. 9B (time "g"), once the starter defect 910 has been created and the glass sheet 238 is still moving in the downward direction then the laser 902 directs a second laser beam 912 towards the flip mirror 908 which has been moved so that the second laser beam 912 would be directed on a laser scoring path 914 (instead of on the ablation path 906) towards the moving glass sheet 238. In this example, the laser 902 directs the second laser beam 912 towards the flip mirror 908 which directs the second laser beam 912 towards a tilted mirror 916 which re-directs the second laser beam 912 through a plano-convex cylindrical lens 918 and a plano-concave cylindrical lens 920 (optional) which output an elongated laser beam 922 onto the moving glass sheet 238 (note: the elongated laser beam 922 has a different orientation that is perpendicular to the glass sheet 238 when compared to the elongated laser beams 322 and 822). To create this elongated laser beam 922, the position of lenses 918 and 920 can be interchanged if desired. The third liquid jet 252c also directs a stream of liquid 924 towards the moving glass sheet 238 where the liquid 924 is typically located on the left side (trailing edge) of the elongated laser beam 922 path.

Figure 9C:
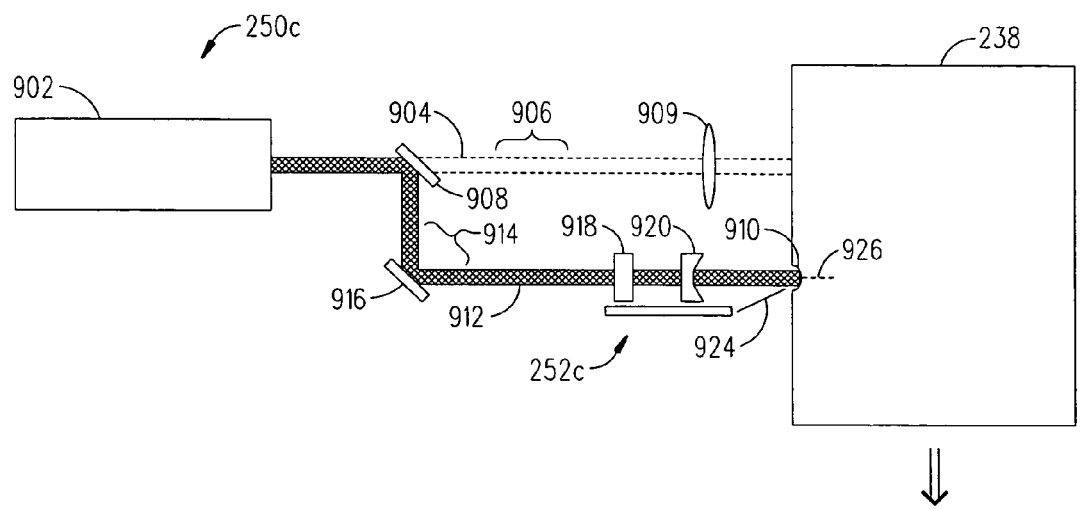

In FIG. 9C (time "h"), the moving glass sheet 238 has moved such that elongated laser beam 922 and stream of liquid 924 are now directed at the starter defect 910 to create a vent 926 in the moving glass sheet 238. In particular, the elongated laser beam 922 heats the moving glass sheet 238 and the stream of liquid 924 cools the moving glass sheet 238 such that the starter defect 910 forms the vent 926 which can have varying depths within the moving glass sheet 238 (see FIGS. 5-6). The third liquid jet 252c or additional liquid jet could be alternatively located on the opposite side of the moving glass sheet 238 when compared to the location of the first laser 902. In this configuration the elongated laser beam 922 and stream of liquid 924 are incident on opposite faces of the glass sheet 238.

Figure 9D:
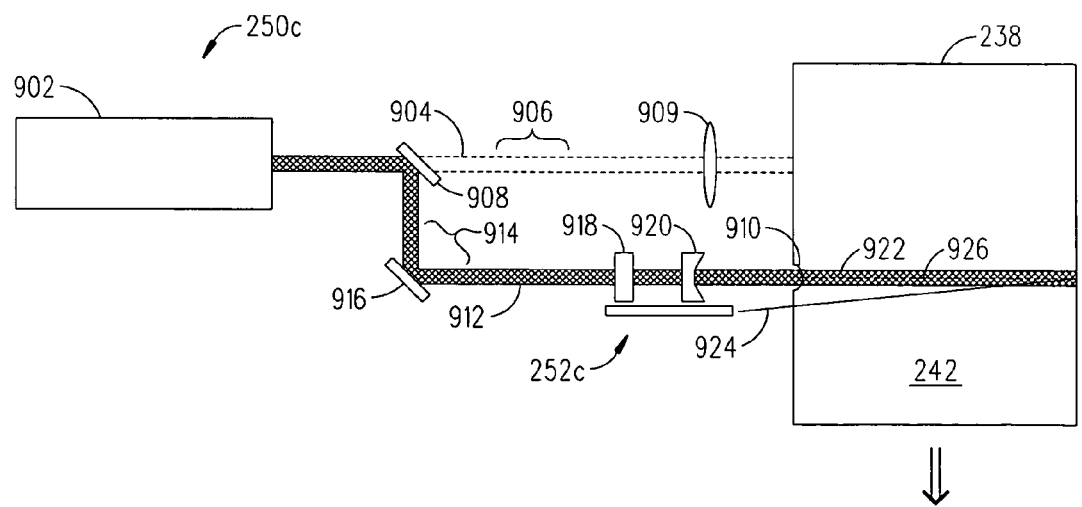

In FIG. 9D (time "i"), the third laser mechanism 250c and the third liquid jet 252c are moved across the surface of the downward moving glass sheet 238 to propagate the vent 926 in a horizontal direction along the moving glass sheet 238 to separate or enable the separation of the moving glass sheet 238 into distinct pieces of glass sheets 242. In particular, the laser 902 and the third liquid jet 252c continue to direct the elongated laser beam 922 and the stream of liquid 924 at the moving glass sheet 238 to propagate the vent 926 in a horizontal direction along the moving glass sheet 238 to separate or enable the separation of the moving glass sheet 238 into distinct pieces of glass sheets 242. For instance, the propagated vent 926 can be a scribe in which case a device (not shown) can be used to press-on and bend the moving glass sheet 238 so it separates into a distinct glass sheet 242. Alternatively, the propagated vent 926 can be a full-body cut in which case the moving glass sheet 238 will be separated into a distinct glass sheet 242. In one example, the third laser mechanism 250c and the third liquid jet 252c can be attached to a traveling anvil machine (not shown) so that they can be moved across in a downward fashion along the surface of the downward moving glass sheet 238 while propagating the vent 926 in the horizontal direction along the moving glass sheet 238 to separate or enable the separation of the moving glass sheet 238 into distinct pieces of glass sheets 242.

Figure 10A:
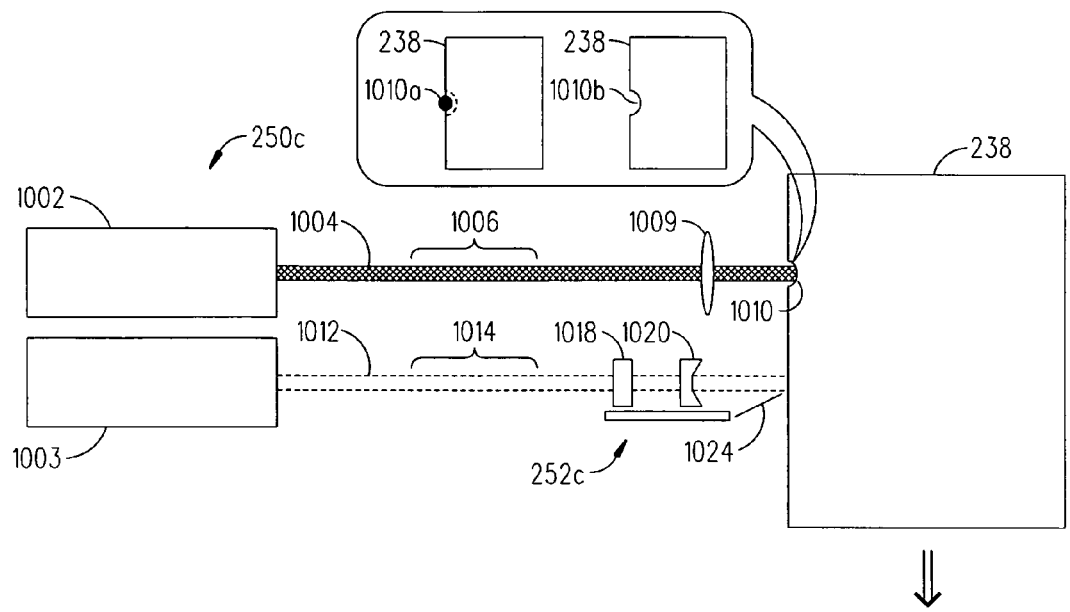
FIGS. 10A-10D are block diagrams of the non-contact glass shearing device shown in FIG. 2 at different points in time which are used to help explain how another configuration of a laser mechanism and a liquid jet are used to separate or enable the separation of the moving glass sheet (without the outer edges) into distinct pieces of glass sheets in accordance with an embodiment of the present invention.

Referring to FIG. 10A-10D, there are block diagrams of the non-contact glass shearing device 201 at different points in time which are used to help explain how another configuration of the third laser mechanism 250c and the third liquid jet 252c are used to separate or enable the separation of the moving glass sheet 238 (without the outer edges 240a and 240b) into distinct pieces of glass sheets 242 in accordance with an embodiment of the present invention. In FIG. 10A (time "f"), the third laser mechanism 250c includes a first laser 1002 that directs a first laser beam 1004 along an ablation (defect initiation) path 1006 through a plano-convex lens 1009 (optional) so as to interface with the moving glass sheet 238 for a predetermined time to create a starter defect 1010 within the moving glass sheet 238. The starter defect 1010 can be either a residual stress field 1010a or an ablation groove 1010b in the moving glass sheet 238 depending on the power of the first laser beam 1004. The residual stress field 1010a would normally take less laser power density to create when compared to the laser power density that would be needed to create the ablation groove 1010b.

Figure 10B:
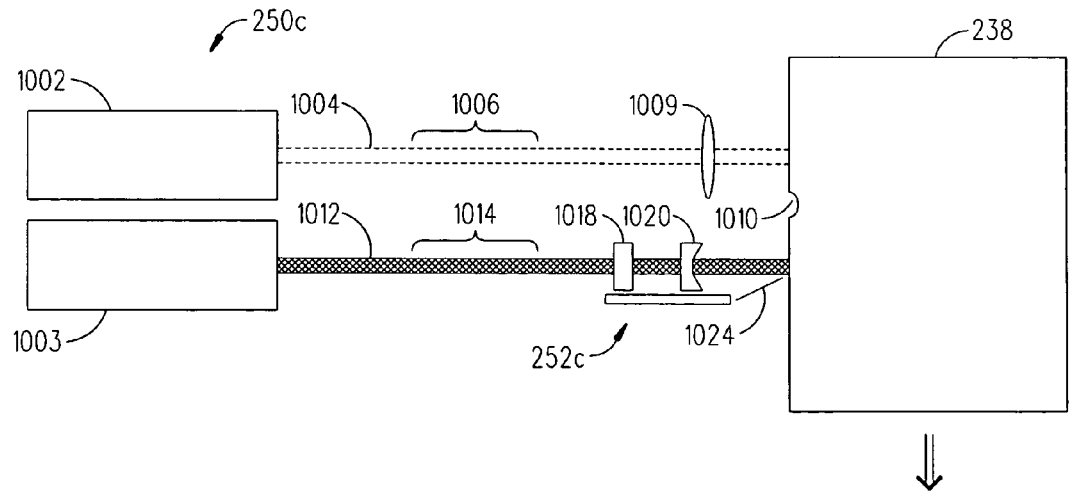

As shown in FIG. 10B (time "g"), once the starter defect 1010 has been created and the glass sheet 238 is still moving in the downward direction then a second laser 1003 directs a second laser beam 1012 on a laser scoring path 1014 towards the moving glass sheet 238. The first laser 1002 is not operating at this point in time. In this example, the second laser 1003 directs the second laser beam 1012 through a plano-convex cylindrical lens 1018 and a plano-concave cylindrical lens 1020 (optional) which output an elongated laser beam 1022 onto the moving glass sheet 238 (note: the elongated laser beam 1022 has a different orientation that is perpendicular to the glass sheet 238 when compared to the elongated laser beams 322 and 822). To create this elongated laser beam 1022, the position of lenses 1018 and 1020 can be interchanged. The third liquid jet 252c also directs a stream of liquid 1024 towards the moving glass sheet 238 where the liquid 1024 is typically located within the left side (trailing edge) of the elongated laser beam 1022 path.

Figure 10C:
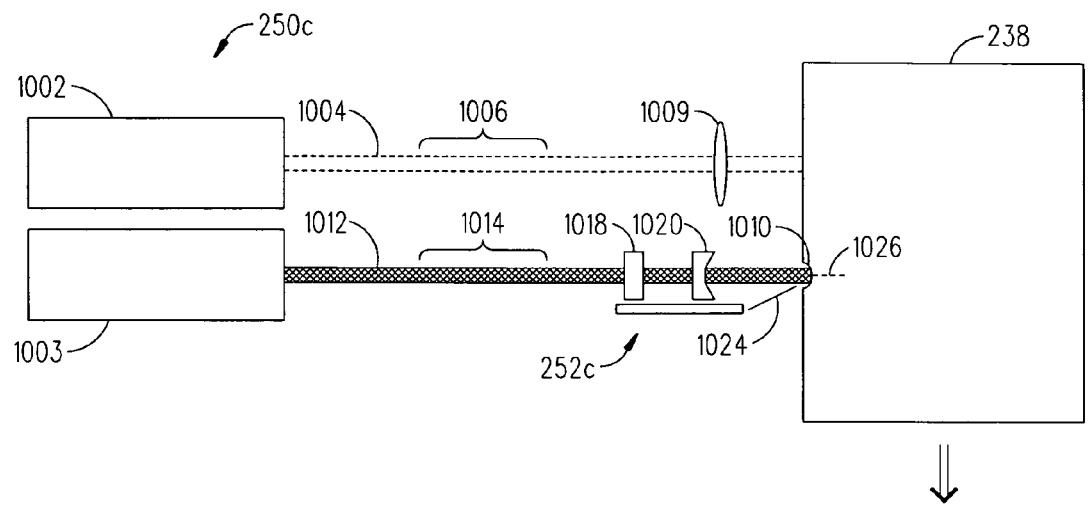

In FIG. 10C (time "g"), the moving glass sheet 238 has moved such that elongated laser beam 1022 and stream of liquid 1024 are now directed at the starter defect 1010 to create a vent 1026 in the moving glass sheet 238. In particular, the elongated laser beam 1022 heats the moving glass sheet 238 and the stream of liquid 1024 cools the moving glass sheet 238 such that the starter defect 1010 forms the vent 1026 which can have varying depths within the moving glass sheet 238 (see FIGS. 5-6). The third liquid jet 252c or additional liquid jet could be alternatively located on the opposite side of the moving glass sheet 238 when compared to the location of the first laser 1002. In this configuration the elongated laser beam 1022 and stream of liquid 1024 are incident on opposite faces of the glass sheet 238.

Figure 10D:
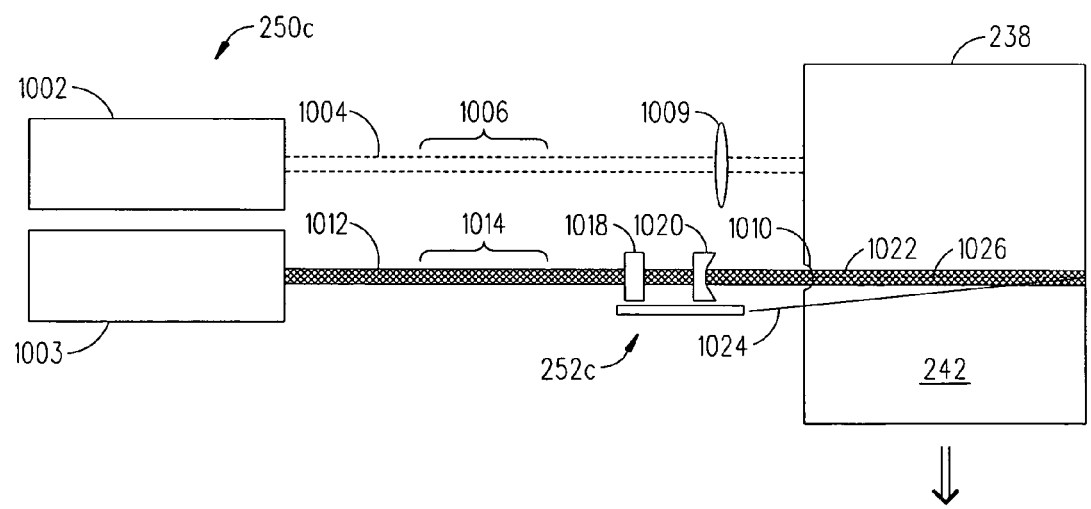

In FIG. 10D (time "i"), the third laser mechanism 250c and the third liquid jet 252c are moved across the surface of the downward moving glass sheet 238 to propagate the vent 1026 in a horizontal direction along the moving glass sheet 238 to separate or enable the separation of the moving glass sheet 238 into distinct pieces of glass sheets 242. In particular, the laser 1003 and the third liquid jet 252c continue to direct the elongated laser beam 1022 and the stream of liquid 1024 at the moving glass sheet 238 to propagate the vent 1026 in a horizontal direction along the moving glass sheet 238 to separate or enable the separation of the moving glass sheet 238 into distinct pieces of glass sheets 242. For instance, the propagated vent 1026 can be a scribe in which case a device (not shown) can be used to press-on and bend the moving glass sheet 238 so it separates into a distinct glass sheet 242. Alternatively, the propagated vent 1026 can be a full-body cut in which case the moving glass sheet 238 will be separated into a distinct glass sheet 242. In one example, the third laser mechanism 250c and the third liquid jet 252c can be attached to a traveling anvil machine (not shown) so that they can be moved across in a downward fashion along the surface of the downward moving glass sheet 238 while propagating the vent 1026 in the horizontal direction along the moving glass sheet 238 to separate or enable the separation of the moving glass sheet 238 into distinct pieces of glass sheets 242.

From the foregoing, it can be readily appreciated by those skilled in the art that the non-contact glass shearing device 201 and method of the present invention can vertically scribe or cut a downward moving glass sheet 238 to remove the outer edges (beads) 240a and 240b from the downward moving glass sheet 238. In addition, the non-contact glass shearing device 201 and method can horizontally scribe or cut the downward moving glass sheet 238 so that it can be separated into distinct glass sheets 242. It should also be appreciated that the non-contact glass shearing device 201 can include a processor 260 and a memory 262 that stores processor-executable instructions where the processor 260 interfaces with the memory and executes the processor-executable instructions to enable the aforementioned operation of the laser mechanisms 250a, 250b and 250c and the liquid jets 252a, 252b and 242c so as to remove the outer edges (beads) 240a and 240b from the downward moving glass sheet 238 and to separate the moving glass sheet 238 into distinct glass sheets 242 (see FIG. 2).

The following are some additional features and advantages of the non-contact glass shearing device 201:

One $CO_2$ laser can be used that both generates a starter defect (e.g., defect initiator) within the glass sheet 238 and cuts the glass sheet 238 based on a thermal shock approach (see FIGS. 3 and 9).

In another approach, a low-power, inexpensive, sealed-tube $CO_2$ laser can be used to generate a starter defect (e.g., defect initiator) within the glass sheet 238 while another CO2 laser is used to cut the glass sheet 238 based on a thermal shock approach (see FIGS. 8 and 10).

The method of generating defect starters (e.g., defect initiators) within a glass sheet 238 (e.g., at a location spaced from an edge of the glass) using a $CO_2$ laser is non-contact, hence it is particularly useful with thin glass sheets (e.g., less than or equal to 0.3 mm and less than 0.1 mm thick glass sheets) since defect starters made from mechanical impact are not desired.

The method can be used in on-draw cutting applications such as on-draw edge beads removal, and horizontally cutting the glass sheet into distinct pieces of glass sheets. The laser defect initiation process can be used to start the scoring process or periodically during the process to maintain the directions of scoring propagation.

The non-contact glass shearing device 201 can be used to separate glass sheets that have a thickness which is less than about 1 mm, preferably <0.5 mm, more preferably <0.3 mm, most preferably <0.1 mm.

Although multiple embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

The invention claimed is:

1. A method for removing an outer edge from a moving glass sheet, said method comprising the steps of:
    directing a first laser beam at the moving glass sheet to create a first starter defect in the moving glass sheet at a location spaced from an edge of the glass sheet, wherein the glass sheet has a thickness ≤300 microns, and wherein the first starter defect produces a residual stress field in the glass sheet;
    once the first starter defect has been created, turning off the first laser beam, then moving the glass sheet with the first starter defect, and then directing a second laser beam at the first starter defect in the moving glass sheet while the first laser beam is turned off;
    directing a first stream of liquid at the first starter defect in the moving glass sheet, where the second laser beam and the first stream of liquid create a first vent in the moving glass sheet;
    maintaining the directing of the second laser beam and the first stream of liquid at the moving glass sheet even after the first starter defect has passed to propagate the first vent in the moving glass sheet where the propagated first vent enables removal of the outer edge from the moving glass sheet.

2. The method of claim 1, wherein the first starter defect includes an ablation groove within the residual stress field in the moving glass sheet.

3. The method of claim 1, wherein the first laser beam has more power density when compared to a power density of the second laser beam.

4. The method of claim 1, wherein the first vent is a scribe or a full-body cut.

5. The method of claim 1, wherein said step of directing the second laser beam further includes a step of directing the second laser beam through at least one optic to form an elongated second laser beam that interfaces with the first starter defect and the moving glass sheet to create and propagate the first vent in the moving glass sheet.

6. The method of claim 1, further comprising the step of creating another defect in the moving glass sheet to help control a direction of the propagated first vent.

7. The method of claim 1, further comprising a step of controlling a laser power of the second laser beam and a speed of the moving glass sheet to control a depth of the first vent in the moving glass sheet.

8. The method of claim 1, where the moving glass sheet has a thickness which is less than about 100 microns.

9. The method of claim 1, further comprising the steps of:
    directing a third laser beam at the moving glass sheet to create a second starter defect in the moving glass sheet;
    once the second starter defect has been created and the glass sheet has been moving, then directing a fourth laser beam at the second starter defect in the moving glass sheet;
    directing a second stream of liquid at the second starter defect in the moving glass sheet, where the fourth laser beam and the second stream of liquid create a second vent within the moving glass sheet; and
    maintaining the directing of the fourth laser beam and the second stream of liquid at the moving glass sheet to propagate the second vent in a horizontal direction within the moving glass sheet where the propagated second vent enables a distinct glass sheet to be separated from the moving glass sheet.

10. The method of claim 1, wherein after the first starter defect in the moving glass sheet has passed by the second laser beam and the first stream of liquid then performing a step of directing the first laser beam at the moving glass sheet at a position on the glass sheet that is ahead of the position of the second laser beam to create another defect in the moving glass sheet.

11. A non-contact glass shearing device, said glass shearing device comprising:
    a first RF excited laser unit that directs a first laser beam along a defect initiation path and bypassing a flip mirror which has been moved out of the way so the first laser beam interfaces with the moving glass sheet to create a first starter defect in the moving glass sheet at a location spaced from an edge of the glass sheet;
    said first laser unit is configured to turn off the first laser beam once the first starter defect has been created and, after the glass sheet has been moving, further directs a second laser beam towards the flip mirror which directs the second laser beam towards a tilted mirror which directs the second laser beam on a laser scoring path so the second laser beam interfaces with the first starter defect in the moving glass sheet;
    a first liquid jet that directs a first stream of liquid at the first starter defect in the moving glass sheet, where the first stream of liquid is located within or below a trailing edge of the second laser beam, and where the second laser beam and the first stream of liquid create a first vent in the moving glass sheet while the first laser beam is turned off; and
    said first laser unit and said first liquid jet both maintain the directing of the second laser beam and the first stream of liquid at the moving glass sheet after the first starter defect has passed to propagate the first vent in the moving glass sheet where the propagated first vent enables removal of an outer edge from the moving glass sheet.

12. The non-contact glass shearing device of claim 11, wherein said first laser unit directs the second laser beam through at least one optic to form an elongated second laser beam that interfaces with the first starter defect and the moving glass sheet to create and propagate the first vent in the moving glass sheet.

13. The non-contact glass shearing device of claim 12, wherein the at least one optic further includes a plano-convex cylindrical lens and a plano-concave cylindrical lens.

14. The non-contact glass shearing device of claim 11, wherein the first RF excited laser unit is a $CO_2$ laser unit.

15. The non-contact glass shearing device of claim 11, wherein the laser scoring path is downstream from the defect initiation path and the first stream of liquid is located downstream from the laser scoring path.

16. The non-contact glass shearing device of claim 11, wherein after the first starter defect in the moving glass sheet has passed by the second laser beam and the first stream of liquid then the first laser unit directs the first laser beam along the defect initiation path and bypassing the flip mirror which has been moved out of the way so the first laser beam interfaces with the moving glass sheet to create another defect in the moving glass sheet, and after the another defect in the moving glass sheet has passed by the second laser beam and the first stream of liquid then the first laser unit directs the first laser beam along the defect initiation path and bypassing the flip mirror which has been moved out of the way so the first laser beam interfaces with the moving glass sheet to create yet another defect in the moving glass sheet, where the another defect and the yet another defect control a direction of the propagated first vent in the moving glass sheet.

17. The non-contact glass shearing device of claim 11, wherein the first laser unit further controls a laser fluence of the first laser beam to be in a range of about 5 kW/cm$^2$ to 70 kW/cm$^2$ to control a depth of the first vent in the moving glass sheet.

18. The non-contact glass shearing device of claim 11, wherein the first vent is a scribe or a full-body cut.

19. The non-contact glass shearing device of claim 11, wherein the first laser unit includes a $CO_2$ laser unit which directs the first laser beam at the moving glass sheet to create the starter defect in the moving glass sheet at a location spaced from an edge of the glass sheet.

20. The non-contact glass shearing device of claim 11 further comprising:
- a second laser unit that directs a third laser beam at the moving glass sheet to create a second starter defect in the moving glass sheet;
- said second laser unit further directs a fourth laser beam at the second starter defect in the moving glass sheet;
- a second liquid jet that directs a second stream of liquid at the second starter defect in the moving glass sheet, where the fourth laser beam and the second stream of liquid create a second vent within the moving glass sheet; and
- said second laser unit and said second liquid jet both maintain the directing of the fourth laser beam and the second stream of liquid at the moving glass sheet to propagate the second vent in a horizontal direction within the moving glass sheet where the propagated second vent enables a distinct glass sheet to be separated from the moving glass sheet.

21. The non-contact glass shearing device of claim 20, further comprising a traveling anvil machine that moves the second laser unit and the second liquid jet across the moving glass sheet when propagating the second vent to enable the distinct glass sheet to be separated from the moving glass sheet.

22. A non-contact glass shearing device, said glass shearing device comprising:
- a first RF excited laser unit that directs a first laser beam along a defect initiation path to interface with the moving glass sheet and creates a first starter defect in the moving glass sheet at a location spaced from an edge of the glass sheet, wherein the starter defect includes a residual stress field in the glass;
- a second laser unit that once the first starter defect has been created and the glass sheet has been moving further directs a second laser beam along a laser scoring path, downstream from the defect initiation path, to interface with the first starter defect in the moving glass sheet;
- a first liquid jet that directs a first stream of liquid, downstream from the laser scoring path, at the first starter defect in the moving glass sheet, where the first stream of liquid is located within or below a trailing edge of the second laser beam, and where the second laser beam and the first stream of liquid create a first vent in the moving glass sheet;
- after the first starter defect in the moving glass sheet has passed by the second laser beam and the first stream of liquid, the first laser unit directs the first laser beam along the defect initiation path to interface with the moving glass sheet and create another defect in the moving glass sheet, and after the another defect in the moving glass sheet has passed by the second laser beam and the first stream of liquid then the first laser unit directs the first laser beam along the defect initiation path to interface with the moving glass sheet and create yet another defect in the moving glass sheet; and
- said second laser unit and said first liquid jet both maintain the directing of the second laser beam and the first stream of liquid at the moving glass sheet after the first starter defect, the another defect, and the yet another defect have passed to propagate the first vent in the moving glass sheet in a controlled manner where the propagated first vent enables removal of an outer edge from the moving glass sheet.

23. The non-contact glass shearing device of claim 22, wherein said second laser unit directs the second laser beam through at least one optic to form an elongated second laser beam that interfaces with the first starter defect and the moving glass sheet to create and propagate the first vent in the moving glass sheet.

* * * * *